United States Patent
Lévesque et al.

(10) Patent No.: US 7,221,365 B1
(45) Date of Patent: May 22, 2007

(54) SYSTEM AND METHOD FOR DISTRIBUTING PHOTONS WHEN RENDERING AN IMAGE USING PHOTON MAPPING

(75) Inventors: Daniel Lévesque, Montreal (CA); Pierre Felix Breton, Chambly (CA); Claude Robillard, Varennes (CA)

(73) Assignee: Autodesk, Inc., San Rafael, CA (US)

( * ) Notice: Subject to any disclaimer, the term of this patent is extended or adjusted under 35 U.S.C. 154(b) by 277 days.

(21) Appl. No.: 10/996,594

(22) Filed: Nov. 23, 2004

(51) Int. Cl.
*G06T 15/00* (2006.01)

(52) U.S. Cl. ................................. 345/426

(58) Field of Classification Search ............ None
See application file for complete search history.

(56) References Cited

U.S. PATENT DOCUMENTS

| | | | | |
|---|---|---|---|---|
| 4,928,250 A | * | 5/1990 | Greenberg et al. | 345/426 |
| 5,305,730 A | * | 4/1994 | Fish | 125/21 |
| 5,313,568 A | * | 5/1994 | Wallace et al. | 345/426 |
| 5,936,633 A | * | 8/1999 | Aono et al. | 345/589 |
| 6,078,332 A | * | 6/2000 | Ohazama | 345/426 |
| 6,084,593 A | * | 7/2000 | Gibson | 345/426 |
| 6,796,597 B2 | * | 9/2004 | Mac Farland | 296/108 |
| 7,091,973 B1 | * | 8/2006 | Cohen | 345/426 |
| 2003/0179197 A1 | * | 9/2003 | Sloan et al. | 345/426 |
| 2004/0125103 A1 | * | 7/2004 | Kaufman et al. | 345/419 |
| 2005/0104883 A1 | * | 5/2005 | Snyder et al. | 345/426 |
| 2005/0264568 A1 | * | 12/2005 | Keller | 345/426 |
| 2006/0066616 A1 | * | 3/2006 | Sevastianov et al. | 345/426 |

OTHER PUBLICATIONS

Article "Photon Mapping Made Easy" by Tin-Tin Yu et al., pp. 201-205, ACM 1-58113-997 Jul. 5, 2002.*
Article "Chasing the Green Flash: a Global Illumination Solution for Inhomogeneous Media" by D. Gutierrez et al., ACM 1-58113-967-May 4, 2004.*
Article "Global Illumination using Photon Maps", by Henrik Wann Jensen, pp. 1-14, 1996.*
Article "Low Latency Photon Mapping Using Block Hashing" by Vincent C. H. Ma and Michael D. McCool, The Eurographics Association 2002.*

* cited by examiner

*Primary Examiner*—Mark Zimmerman
*Assistant Examiner*—Enrique L. Santiago
(74) *Attorney, Agent, or Firm*—Patterson & Sheridan LLP

(57) ABSTRACT

A method for distributing photons among light sources when rendering an image of a scene using photon mapping includes the steps of computing a total energy for the scene, where the scene includes a plurality of light sources, and computing an average energy of the light sources. The method also includes the steps of comparing, for each of the light sources, the actual energy of the light source to an average energy of the light source and distributing photons to each of the light sources based on the comparison.

20 Claims, 2 Drawing Sheets

//\//

SYSTEM AND METHOD FOR DISTRIBUTING PHOTONS WHEN RENDERING AN IMAGE USING PHOTON MAPPING

BACKGROUND OF THE INVENTION

1. Field of the Invention

This invention generally relates to computer graphics and more specifically to a system and method for distributing photons when rendering an image using photon mapping.

2. Description of the Background Art

Global illumination is a lighting technique in computer graphics that attempts to compute all light interactions within a scene to obtain a photorealistic image. Global illumination mimics the subtleties of natural light by tracing the light rays bouncing between a collection of radiating objects in the scene and incorporating the diffuse color properties of those objects in the reflected light rays. Accounting for these inter-reflected light rays when rendering an image of the scene produces a much more realistic image since, among other things, the light scattered and diffused throughout the environment creates more accurate tones and shadows.

The computational intensity of global illumination rendering has made implementing this lighting technique in commercial rendering products historically impractical. However, with recent advances in graphics processing, global illumination rendering has become more commercially feasible. One well-known method used for calculating fast and accurate solutions to the global illumination problem is photon mapping, which is an extension of ray tracing. Photon mapping is a two-pass algorithm. The first pass consists of tracing photons from the light sources in a scene and storing these photons in a photon map as they interact with elements in the scene. The second pass consists of rendering, where the photon map is used to provide estimates of the reflected radiance of the different surfaces in the scene.

Generally, a quality-computation time trade-off exists for photon mapping. On the one hand, the more photons emitted from each light source in a scene during photon mapping, the higher the quality of the rendered image of the scene. On the other hand, however, computation time is proportional to the number of photons used for photon mapping. So, for example, doubling the number of photons to improve image quality may double computation time.

Another characteristic of photon mapping (and global illumination, generally) is that certain light sources in the scene may have greater influence on image quality than other light sources. For example, bright light sources tend to have a disproportionate effect on image quality compared to dim light sources. Thus, in theory, one way to increase image quality is to identify the brightest light sources in a scene and then allocate more photons to those light sources when rendering an image of the scene using photon mapping.

A significant drawback of commercial renderers that implement photon mapping is that the graphics artist designing a scene usually has to designate the number of photons to be emitted from each of the different light sources in the scene during the photon mapping step. This approach causes several problems. First, as described above, to increase image quality, the graphics artist may try to determine which light sources in the scene influence image quality the most and then allocate more photons to those light sources for photon mapping. Making such determinations is quite difficult given the technical complexity of most rendering applications and may oftentimes lead to a time consuming trial-and-error process. Therefore, the graphics artist may simply increase the number of photons allocated to each of the light sources in the scene to increase overall image quality. But, as also described above, increasing the total number of photons for photon mapping may dramatically increase overall computation time (as well as adversely affect system memory requirements). These problems are exacerbated when light sources are added or removed from the scene or when the energy level of one or more light sources in the scene changes over time. In each situation, for example, the graphics artist must reallocate photons to the different light sources in the scene to account for the new lighting environment.

What is needed in the art is a technique for systematically distributing photons to the different light sources in a scene in a way that optimizes the trade-off between image quality and computation time.

SUMMARY OF THE INVENTION

One embodiment of a method for distributing photons among light sources when rendering an image of a scene using photon mapping includes the steps of computing a total energy for the scene, where the scene includes a plurality of light sources, and computing an average energy of the light sources. The method also includes the steps of comparing, for each of the light sources, the actual energy of the light source to an average energy of the light source and distributing photons to each of the light sources based on the comparison.

The disclosed method systematically distributes more photons to higher-energy light sources in the scene. Such a distribution is advantageous because, as a general matter, the effects of indirect lighting from a higher-energy light source on image quality far outweigh the effects of indirect lighting from a lower-energy light source. By distributing proportionally more photons to higher-energy light sources within the scene, more processing time is spent on the indirect lighting effects from the higher-energy light sources, thereby substantially improving image quality against overall processing time.

DETAILED DESCRIPTION OF THE INVENTION

Figure 1:
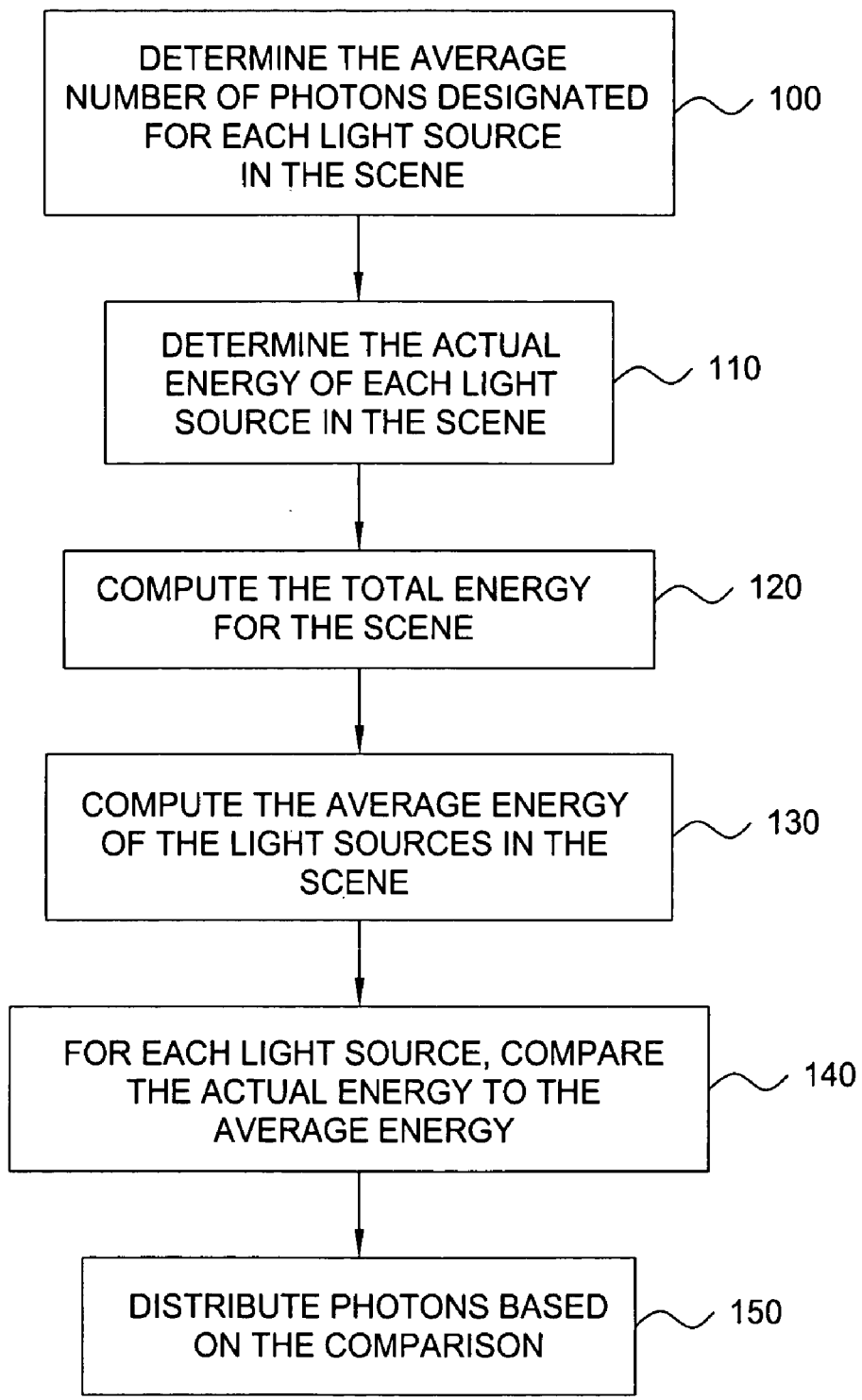
FIG. 1 is a flow chart of method steps for distributing photons among light sources when rendering an image of a scene using photon mapping, according to one embodiment of the invention.

FIG. 1 is a flow chart of method steps for distributing photons among light sources when rendering an image of a scene using photon mapping, according to one embodiment of the invention. Persons skilled in the art will understand that any system configured to perform the method steps, in any order, is within the scope of the invention.

As shown in FIG. 1, the method for distributing photons starts in step 100 where a renderer controller (or equivalent functional element) in a rendering application determines the average number of photons to be emitted from each of the light sources in the scene during photon mapping. Typically, the average number of photons per light source is a value designated by a user of the rendering application. For example, the average number of photons may be a number the user inputs directly into the rendering application when rendering an image of the scene. If the user does not supply an average number of photons per light source, a default value may be used instead. The product of the number of light sources in the scene and the average number of photons per light source represents the total number of photons that are used in the photon mapping algorithm during rendering (i.e., a "budget" of photons for photon mapping). As is described in further detail below, the disclosed method determines how these photons should be distributed among the various light sources in the scene to optimize the trade-off between image quality and computation time.

In step 110, the renderer controller determines the actual energy of each of the light sources in the scene. As is well known, the user may select and place each of the light sources in the scene as well as define various parameters for any particular light source, such as the position, intensity and color of the light source. In one embodiment, the renderer controller determines the actual energy of a light source from these lighting parameters. In alternative embodiments, the renderer controller may determine the energy of a light source from a combination of one or more of these parameters with other lighting parameters or from other lighting parameters all together.

In step 120, the total energy for the scene is computed. In one embodiment, the renderer controller sums together the actual energy of each of the light sources in the scene to compute the total energy for the scene. However, in alternative embodiments, other ways of computing the total energy may be used. In step 130, the average energy of the light sources in the scene is computed. In one embodiment, the renderer controller divides the total energy for the scene by the number of light sources in the scene to compute the average energy of the light sources. However, in alternative embodiments, other ways of computing the average energy may be used.

In step 140, for each of the light sources in the scene, the renderer controller compares the actual energy of the light source to the average energy of the light source. In one embodiment, this comparison step entails computing the ratio of the actual energy of the light source to the average energy of the light source. In step 150, the renderer controller distributes photons to each of the light sources in the scene based on the comparison in step 140. In one embodiment, to each of the light sources, the renderer controller distributes a number of photons equal to the product of the average number of photons per light source (from step 100) and the ratio of the actual energy of the light source to the average energy of the light source (from step 140).

In alternative embodiments, steps 140 and 150 may be modified to allow for other comparison and distribution techniques. For example, in one alternative embodiment, the comparison of step 140 may entail computing, for each of the light sources in the scene, a ratio of the actual energy of the light source to the total energy for the scene. Then, in step 150, photons may be distributed to each of the different light sources in the scene based on the product of the total number of photons available for photon mapping (i.e., the photon budget) and the ratio computed in step 140. Persons skilled in the art will understand that numerous comparison and distribution techniques may be used to allocate photons among the different light sources in the scene and that the scope of the invention is therefore not limited in any way by the particular technique used.

As is apparent from the foregoing, the method systematically distributes more photons to higher-energy light sources in the scene. The only task left to the user is to choose the overall number of photons (or photon budget) to use for photon mapping. Such a distribution is advantageous because, as a general matter, the effects of indirect lighting from a higher-energy light source on image quality far outweigh the effects of indirect lighting from a lower-energy light source. By distributing proportionally more photons to higher-energy light sources within the scene, more processing time will be spent on the indirect lighting effects from the higher-energy light sources, thereby substantially improving image quality against overall processing time.

For example, suppose a scene has two light sources, one having an energy of 10 watts and another having an energy of 90 watts. Suppose further that the user designates 10,000 photons as the average of number of photons to be emitted from each of the light sources during photon mapping, thereby making a total of 20,000 photons available for photon mapping. As described above, the total energy for the scene is 100 watts (i.e., 10+90), the average energy for each of the light sources is 50 watts (i.e., 100/2), the ratio of the actual energy to the average energy for the first light source is 0.2 (i.e., 10/50), and the ratio of the actual energy to the average energy for the second light source is 1.8 (i.e., 90/50). Thus, according to the above method, 2,000 photons are distributed to the first light source for photon mapping, and 18,000 photons are distributed to the second light source for photon mapping. Because of this photon distribution, the renderer will spend more time processing the indirect lighting effects of the second light source than it will processing the indirect lighting effects of the first light source. For this reason, the image quality of the rendered scene will be greater than if the scene had been rendered having 10,000 photons distributed to each of the two light sources. In this fashion, the disclosed method substantially improves image quality for a given number of photons available for photon mapping (i.e., for a given budget of photons), thus optimizing image quality in view of processing time.

Another advantage of the disclosed method is that the algorithm allows the user to make changes to the lighting of a scene without having to spend time reexamining the distribution of photons among the different light sources in the scene. For example, if the user changes the energy of one of the light sources, the algorithm automatically updates the distribution of photons among the different light sources based on the new actual energy of the one light source. Similarly, if the user adds or removes a light source, the algorithm automatically recomputes how the photons should be distributed among the new number of light sources in the scene and then redistributes the photons accordingly.

Figure 2:
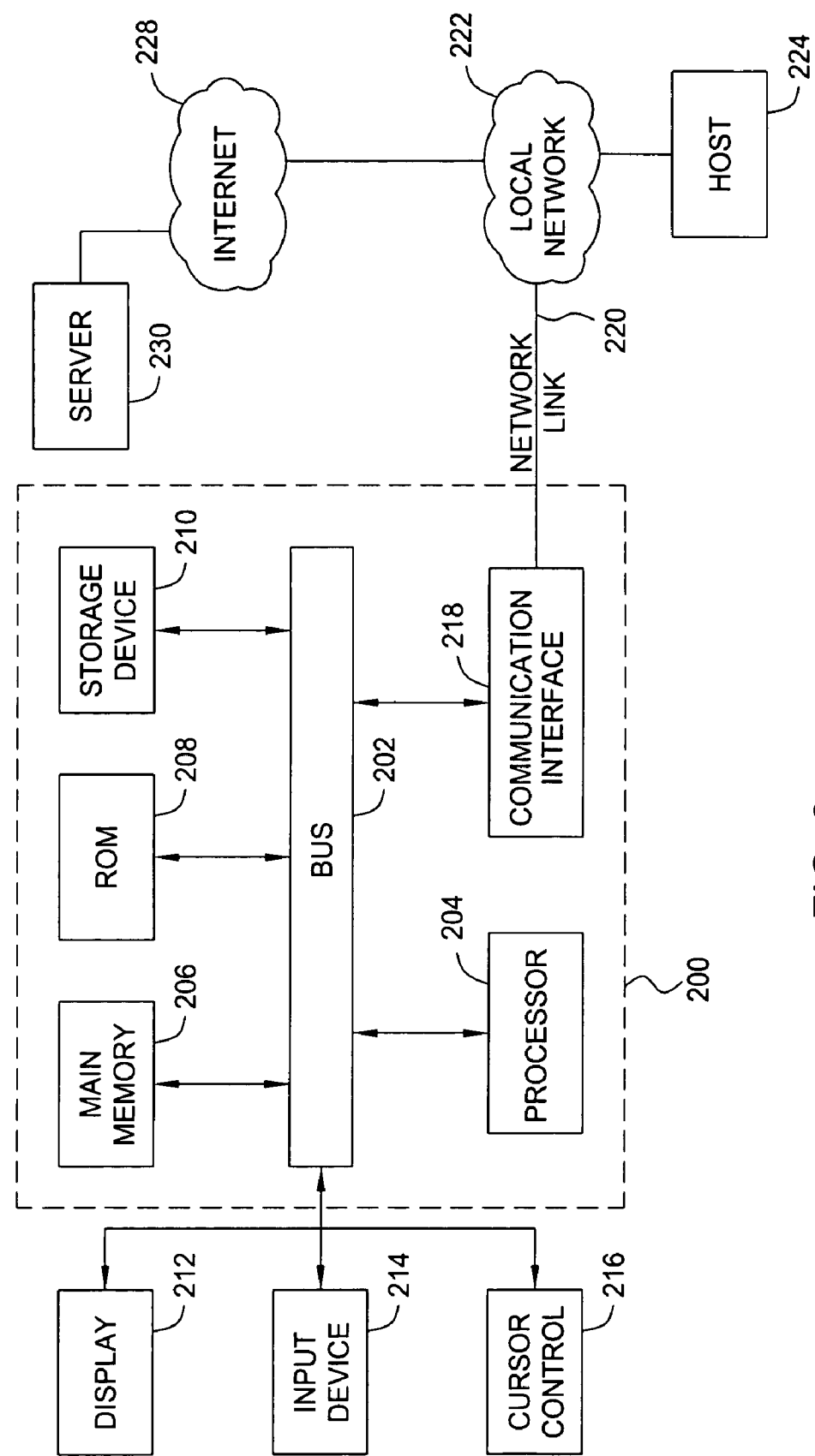
FIG. 2 is a conceptual diagram of a computing device that may be configured to implement the method steps of FIG. 1, according to one embodiment of the invention.

FIG. 2 is a conceptual diagram of a computing device 200 that may be configured to implement the method steps of FIG. 1, according to one embodiment of the invention. Computing device 200 may be any type of computing device such as, for example, a desktop computer, a laptop computer, a server machine, a set-top box, a game system or console, a personal digital assistant or a cellular phone. As shown, computing device 200 includes, without limitation, a bus 202 for communicating information and a processor 204 coupled to bus 202 for processing information. Computing device 200 also includes a main memory 206, such as a random access memory or other dynamic storage device, for storing information and instructions to be executed by processor 204. For example, the rendering application and the renderer controller referenced above in conjunction with FIG. 1 may reside within main memory 206, and processor 204 may execute the instructions for implementing the photon distribution algorithm described herein. Processor 204 may be a central processing unit (CPU), a graphics processor, some other type of special-purpose processor, or a hardware state machine with special-purpose logic dedicated to implementing only the functionality of the photon distribution algorithm.

Computing device 200 may be coupled via bus 202 to a display for displaying information to a user. An input device 214, including alphanumeric and other keys, is coupled to bus 202 for communicating commands and other information to processor 204. Another type of user input device is a cursor control 216, such as a mouse, trackball or direction keys, for communicating command selections and direction information to processor 204 and for controlling cursor position and movement on display 212. Computing device 200 also may include a communication interface 218 coupled to bus 202 that provides access to a local network 222 via a network link 220. Local network 222 may, in turn, couple computing device 200 to a host computer 224 or other device on local network 222, or may couple computing device 200 to more remote devices, such as server 230, through a wide area network, such as Internet 228.

The foregoing describes only one system in which the invention may be implemented. In alternative embodiments, the invention may be implemented in any type of computing device or equivalent system configured to implement the various functionalities described herein. For example, computing device 200 may be a wireless endpoint device configured to access a wireless local area network or other type of wireless network using technologies such as those reflected in the IEEE 802.11 standard, 3G or Bluetooth. Persons skilled in the art will therefore understand that the hardware environment depicted in conjunction with computing device 200 in no way limits the scope of the invention.

The invention has been described above with reference to specific embodiments. Persons skilled in the art, however, will understand that various modifications and changes may be made thereto without departing from the broader spirit and scope of the invention as set forth in the appended claims. For example, the functionality described above in conjunction with FIG. 1 may be implemented in software and/or hardware. The foregoing description and drawings are, accordingly, to be regarded in an illustrative rather than a restrictive sense.

What is claimed is:

1. A method for distributing photons among light sources when rendering an image of a scene using photon mapping, the method comprising:
    computing a total energy for the scene, the scene having a plurality of light sources;
    computing an average energy of the light sources;
    for each of the light sources, comparing the actual energy of the light source to an average energy of the light source; and
    distributing photons to each of the light sources based on the comparison.

2. The method of claim 1, wherein the step of computing a total energy comprises summing together the actual energy of each of the light sources.

3. The method of claim 1, wherein the step of computing an average energy comprises dividing the total energy by the number of light sources in the plurality of light sources.

4. The method of claim 1, wherein the step of comparing comprises computing, for each of the light sources, a ratio of the actual energy of the light source to the average energy of the light source.

5. The method of claim 4, wherein, for each of the light sources, the number of photons distributed equals the product of the ratio associated with the light source and an average number of photons designated for each of the light sources.

6. The method of claim 1, further comprising the step of determining the average number of photons designated for each of the light sources.

7. The method of claim 1, further comprising the step of determining the actual energy of each of the light sources.

8. A method for distributing photons among light sources when rendering an image of a scene using photon mapping, the method comprising:
    determining a first actual energy of a first light source and a second actual energy of a second light source;
    computing an average energy of the first light source and the second light source;
    computing a first ratio associated with the first light source equal to the actual energy of the first light source divided by the average energy; and
    distributing to the first light source a number of photons equal to the product of the first ratio and an average number of photons designated for each of the first light source and the second light source.

9. The method of claim 8, further comprising the step of computing a second ratio associated with the second light source equal to the actual energy of the second light source divided by the average energy.

10. The method of claim 9, further comprising the step of distributing to the second light source a number of photons equal to the product of the second ratio and the average number of photons designated for each of the first light source and the second light source.

11. A computer-readable medium storing instructions for causing a computing device to distribute photons among light sources when rendering an image of a scene using photon mapping by performing the steps of:
    computing a total energy for the scene, the scene having a plurality of light sources;
    computing an average energy of the light sources;
    for each of the light sources, comparing the actual energy of the light source to an average energy of the light source; and
    distributing photons to each of the light sources based on the comparison.

12. The computer-readable medium of claim 11, wherein the step of computing a total energy comprises summing together the actual energy of each of the light sources.

13. The computer-readable medium of claim 11, wherein the step of computing an average energy comprises dividing the total energy by the number of light sources in the plurality of light sources.

14. The computer-readable medium of claim 11, wherein the step of comparing comprises computing, for each of the light sources, a ratio of the actual energy of the light source to the average energy of the light source.

15. The computer-readable medium of claim 14, wherein, for each of the light sources, the number of photons distributed equals the product of the ratio associated with the light source and an average number of photons designated for each of the light sources.

16. The computer-readable medium of claim 11, further comprising the step of determining the average number of photons designated for each of the light sources.

17. The computer-readable medium of claim 11, further comprising the step of determining the actual energy of each of the light sources.

18. A system for distributing photons among light sources when rendering an image of a scene using photon mapping, the system comprising:
    a memory configured to store instructions for rendering the image; and
    a processor configured to perform the steps of:
        computing a total energy for the scene, the scene having a plurality of light sources;
        computing an average energy of the light sources,
        for each of the light sources, comparing the actual energy of the light source to an average energy of the light source, and distributing photons to each of the light sources based on the comparison.

19. The system of claim 18, wherein the step of comparing comprises computing, for each of the light sources, a ratio of the actual energy of the light source to the average energy of the light source.

20. The system of claim 18, wherein, for each of the light sources, the number of photons distributed equals the product of the ratio associated with the light source and an average number of photons designated for each of the light sources.

* * * * *